United States Patent [19]

Kassai

[11] Patent Number: 4,577,877

[45] Date of Patent: Mar. 25, 1986

[54] PUSHCART HANDLE HEIGHT ADJUSTING MECHANISM

[75] Inventor: Kenzou Kassai, Osaka, Japan

[73] Assignee: Kassai Kabushikikaisha, Osaka, Japan

[21] Appl. No.: 742,887

[22] Filed: Jun. 10, 1985

[30] Foreign Application Priority Data

Jun. 22, 1984 [JP] Japan .................... 59-93944[U]

[51] Int. Cl.[4] .............................................. B62B 7/08
[52] U.S. Cl. ............................ 280/47.37 R; 280/642; 403/322; 403/328
[58] Field of Search .............. 403/108, 322, 325, 328; 280/47.37 R, 642, 644, 655; 16/111 R, 115

[56] References Cited

U.S. PATENT DOCUMENTS

| | | | |
|---|---|---|---|
| 3,084,949 | 4/1963 | Forster et al. | 280/47.37 R X |
| 3,362,738 | 1/1968 | Dygert et al. | 403/328 X |
| 3,522,955 | 8/1970 | Warner, Jr. | 280/47.37 R |
| 4,032,240 | 6/1977 | Reinhardt et al. | 403/108 |
| 4,056,115 | 11/1977 | Thomas | 403/108 X |
| 4,480,497 | 11/1984 | Locher | 403/108 X |

*Primary Examiner*—John A. Pekar
*Assistant Examiner*—Michael Mar
*Attorney, Agent, or Firm*—W. G. Fasse; D. H. Kane, Jr.

[57] ABSTRACT

A pushcart handle height adjusting mechanism comprises an upper rod (13), a right lower rod (15), a left lower rod, locking holes (20, 21, 22), a right locking pin (24), a left locking pin, a right locking spring (28), a left locking pin, a right slide rod (29), a left slide rod, a connecting rod (36), and adjusting springs (42). When the connecting rod (36) is pulled up to upwardly slide the right slide rod (29) and the left slide rod, the right locking pin (24) and the left locking pin are pushed by the right slide rod (29) and the left slide rod and thereby retracted from the inner wall surfaces of the right lower rod (15) and left lower rod. In this state, if the upper rod (13) is operated for upward or downward movement, the right locking pin (24) and the left locking pin are disengaged from the locking holes (22) to move onto the outer wall surfaces of the right lower rod (15) and left lower rod.

2 Claims, 6 Drawing Figures

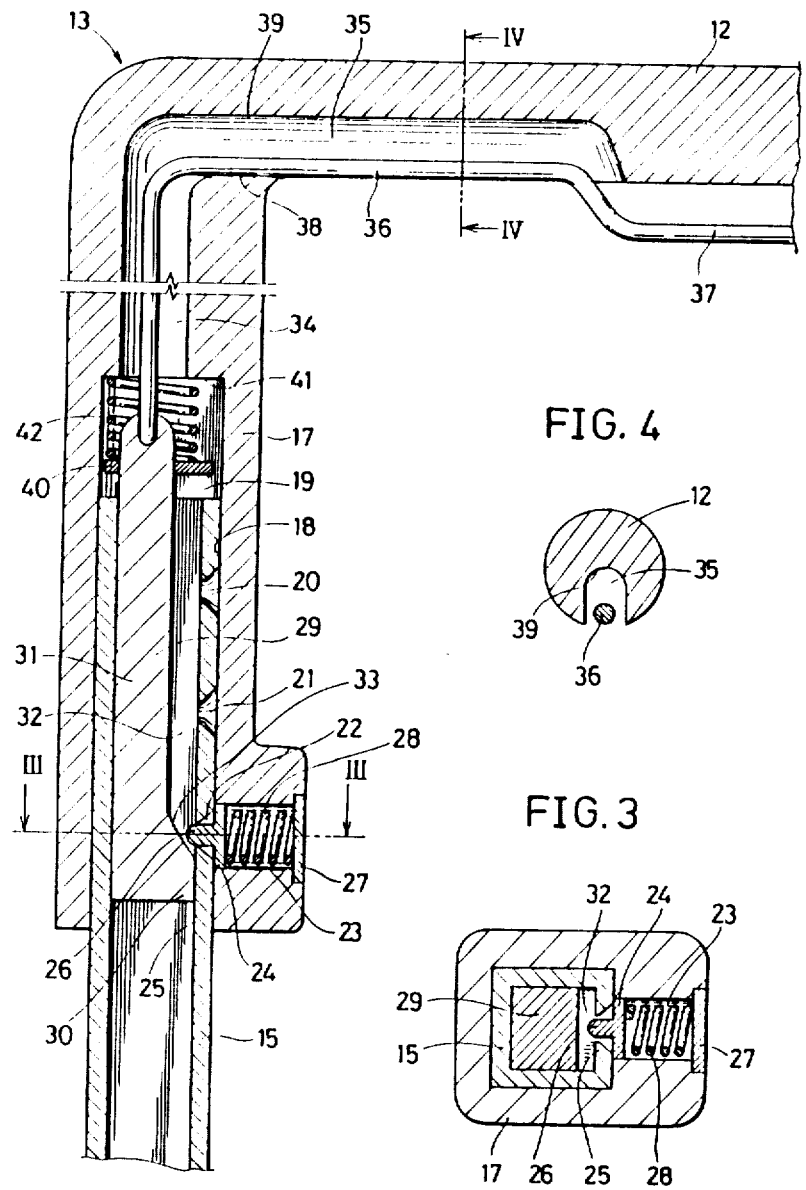

PUSHCART HANDLE HEIGHT ADJUSTING MECHANISM

BACKGROUND OF THE INVENTION

1. Field of the Invention

This invention relates to a mechanism for adjusting the height of the handle of a pushcart.

2. Description of the Prior Art

Pushcarts such as baby carriages and load-carrying carts are provided with a manual push handle. Generally, this handle is fixed to the pushcart body and its height cannot be adjusted. As a result, there have been various inconveniences. That is, among persons who push the pushcart, some are tall and others are short. These persons will find it very inconvenient that the height of the handle cannot be changed.

SUMMARY OF THE INVENTION

Accordingly, an object of this invention is to provide a mechanism by which the height of the handle of a pushcart can be easily adjusted.

According to the invention, the handle of a pushcart comprises an upper rod having a horizontally extending handle portion, and cylindrical right and left lower rods for vertically slidably supporting said upper rod. The upper rod has cylindrical right and left upper rod portions extending downward from the right and left ends thereof. The right and left lower rods are respectively received in the inner wall surfaces of the right and left upper rod portions.

The walls of the right and left lower rods are each formed with a plurality of locking holes which are arranged in vertical alignment and at predetermined intervals. Correspondingly thereto, the walls of the upper rod overlapping the right and left lower rods are provided with right and left locking pins, respectively, which are slidable in a direction at right angles to said wall surfaces. The right and left locking pins have their respective shaft portions adapted to project to the inner wall surface of the right and left lower rods through locking holes formed in the right and left lower rods. Further, the right and left locking pins are urged by right and left locking springs to move toward the right and left lower rods, respectively.

Slidably disposed on the inner walls of the right and left lower rods are right and left slide rods, respectively. The right and left slide rods are interconnected through a connecting rod disposed along the upper rod. The connecting rod is vertically movable within a predetermined range. Further, the connecting rod and the right and left slide rods are urged by adjusting springs to move downward in a unit.

The right and left slide rods are each formed with an inclined surface at a predetermined position. Such inclined surfaces are formed at a position which satisfies the following conditions: When the right and left slide rods are disposed at a relatively lower position, the inclined surfaces will lie below the level of the shaft portions of the right and left locking pins; when the right and left slide rods are upwardly slid, the inclined surfaces will abut against the shaft portions of the right and left locking pins projecting to the inner wall surfaces of the right and left lower rods; and when the right and left slide rods are disposed at a relatively upper position, the inclined surfaces will lie above the level of the shaft portions of the right and left locking pins.

Further, the inclined surfaces, locking holes and shaft portions are so shaped as to achieve the following function: When the connecting rod is operated for upward movement, the inclined surfaces push up the shaft portions against the forces of the right and left springs, and when the upper rod is subsequently operated for slide movement, the shaft portions are disengaged from the locking holes and moved onto the outer wall surfaces of the right and left lower rods.

As described above, according to this invention, the manual push handle comprises an upper rod and right and left lower rods for vertically slidably supporting said upper rod, said right and left lower rods having respective locking holes formed in their walls, the walls of said upper rod being provided with right and left locking pins adapted to engage said locking holes, the arrangement being such that this engagement can be canceled by effecting slide movement of right and left slide rods. Thus, the slide movement of the upper rod can be easily allowed or inhibited by operating a connecting rod which interconnects said right and left slide rods. Therefore, the handle height can be suitably adjusted according to the height of the person who pushes the pushcart.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a sectional view showing a region where an upper rod 13 and a right lower rod 15 shown in FIG. 1 overlap each other;

FIG. 3 is a sectional view taken along the line III—III in FIG. 2;

FIG. 4 is a sectional view taken along the line IV—IV in FIG. 2;

DESCRIPTION OF THE PREFERRED EMBODIMENTS

Figure 1:
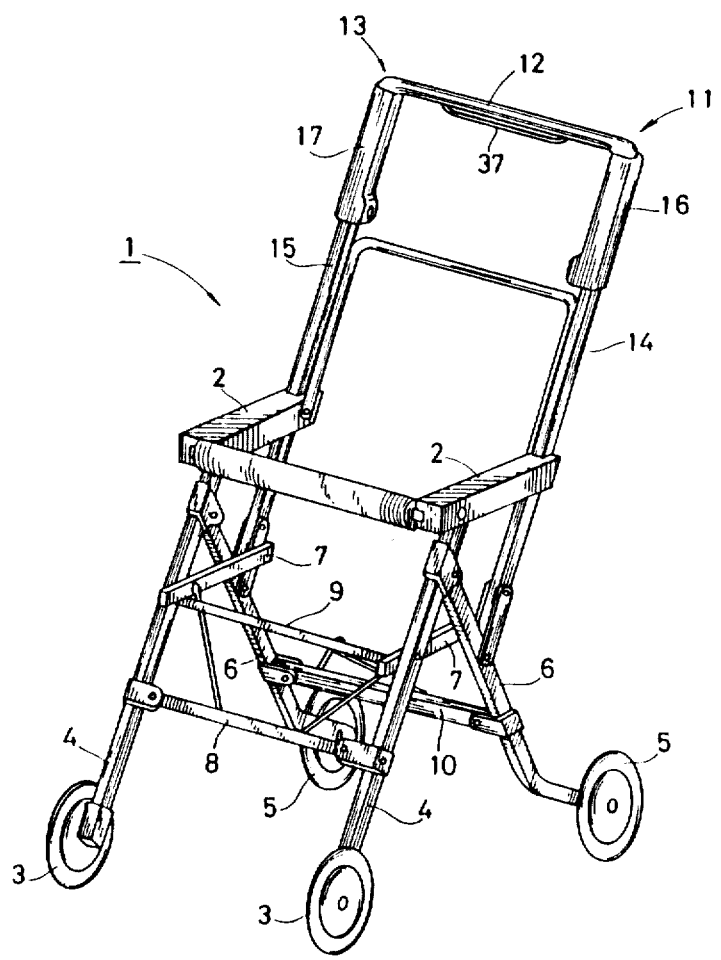
FIG. 1 is a perspective view of a baby carriage having an embodiment of this invention applied thereto.

FIG. 1 is a perspective view of a baby carriage having an embodiment of this invention applied thereto. The baby carriage 1 comprises handrails 2, front legs 4 having respective front wheels 3, rear legs 6 having respective rear wheels 5, seat support rods 7 for supporting a seat, and a push rod i.e., a handle 11 connected at its lower ends to the rear legs 6. The handle 11 will be used in moving the baby carriage 1. This invention relates to a mechanism for adjusting the height of said handle 11.

The handle 11 is of inverted U shape, comprising an upper rod 13 having a horizontal handle portion 12, and cylindrical left and right lower rods 14 and 15 for vertically slidably supporting said upper rod 13. The upper rod 13 has cylindrical left and right upper rod portions 16 and 17 extending downwardly from the left and right ends thereof. The left and right lower rods 14 and 15 are respectively received in the inner wall surfaces of the left and right upper rod portions 16 and 17.

FIG. 2 is a sectional view showing a region where the upper rod 13 and the right lower rod 15 overlap each other, and FIG. 3 is a sectional view taken along the line III—III in FIG. 2. In addition, since the arrangement in which the upper rod 13 and the right lower rod 15 overlap each other is substantially the same as the arrangement in which the upper rod 13 and the left lower rod 14 overlap each other, the arrangement concerning the right lower rod 15 will be described below, a description of the arrangement concerning the left lower rod 14 being omitted.

As shown in FIG. 2, the right upper rod portion 17 extending downwardly from the right end of the handle portion 12 is cylindrical, with its inner wall surface 18 defining a reception opening 19 which receives the cylindrical right lower rod 15. The wall of the right lower rod 15 is formed with a plurality of locking holes 20, 21 and 22 arranged in vertical alignment and at predetermined intervals.

In connection therewith, the wall of the right upper rod portion 17 overlapping the right lower rod 15 is formed with an opening 23 extending in a direction at right angles to said wall surface. Installed in said opening 23 is a right locking pin 24 movable in the direction of the length of the opening 23. The right locking pin 24 has a shaft portion 26 capable of projecting to the inner wall surface 25 of the right lower rod 15 through the locking hole 20, 21 or 22 formed in the right lower rod 15. A cover 27 for covering the opening 23 is attached to the outer wall surface of the right upper rod portion 17, and a right locking spring 28 is interposed between the cover 27 and the right locking pin 24. Thus, the right locking pin 24 is urged by this right locking spring 28 to move toward the right lower rod 15.

As shown in FIGS. 2 and 3, when the shaft portion 26 of the right locking pin 24 is inserted in the locking hole 20, 21 or 22 of the right lower rod 15, slide movement of the right upper rod portion 17, i.e., the upper rod 13 is inhibited. The state of inhibition of slide movement is reliably maintained by the action of the right locking spring 28.

Installed in the inner wall surface 25 of the right lower rod 25 is a right slide rod 29 which is vertically slidable. The size of the lower end 30 of the right slide rod 29 is such that it is capable of abutting against the inner wall surface 25 of the right lower rod 15 which is formed with the locking holes 20, 21 and 22. On the other hand, the size of the upper portion 31 thereof above said lower portion 30 is such that a clearance 32 is defined between it and the inner wall surface 25 which is formed with the locking holes 20, 21 and 22. An inclined surface 33 is formed between the lower end 30 and the upper portion 31.

In connection with the right slide rod 29, the right upper rod portion 17 is formed with an insertion hole 34 extending from the upper end thereof to the reception opening 19. As shown in FIGS. 2 and 4, the bottom surface of the handle portion 12 is formed with an upward recess 35 extending from adjacent the middle to the right end thereof. A connecting rod 36 extends through the recess 35 and insertion hole 34. One end of the connecting rod 36 is connected to the upper end of the right slide rod 29. Though not shown, a left slide rod substantially identical with the right slide rod 29 is disposed in the inner wall surface of the left slide rod 14, and the other end of the connecting rod 36 is connected to the upper end of said left slide rod. As shown in FIGS. 1 and 2, the middle portion 37 of the connecting rod 36 comes out of the recess 35 and projects downwardly beyond the handle portion 12. Further, the connecting rod 36 is adapted to be vertically moved within a predetermined range. In the illustrated embodiment, the terminal end of the downward movement of the connecting rod 36 is defined by the connecting rod abutting against an abutment surface 38 on the upper rod of the right upper rod portion 36. On the other hand, the terminal end of the upward movement of the connecting rod 36 is defined by the connecting rod 36 abutting against the bottom surface 39 of the recess 35. Thus, the connecting rod 36, right slide rod 29 and left slide rod are urged by adjusting springs 42 to move downward. The slide operation on the right slide rod 29 and left slide rod is effected by vertically moving the middle portion 37 of the connecting rod 36. That is, the person who pushes the baby carriage simultaneously grips the handle portion 12 and the middle portion 37 of the connecting rod 36 and moves the middle portion 37 upward, whereupon the right slide rod 29 and left slide rod are upwardly slid. Then, the person lets go his grip, whereupon the right slide rod 29 and left slide rod are downwardly slid by the action of the adjusting springs 42.

The inclined surface 33 formed on the right slide rod 29 should be located at a position which makes it possible to attain the following state: When the right slide rod 29 is at a relatively lower position, the inclined surface 33 is positioned below the level of the shaft portion 26 of the right locking pin 24; when the right slide rod 29 is upwardly slid, the inclined surface abuts against the shaft portion 26 of the right locking pin projecting beyond the inner wall surface 25; and when the right slide rod 29 is at a relatively upper position, the inclined surface is positioned above the level of the shaft portion 26 of the right locking pin 24.

Figure 5:
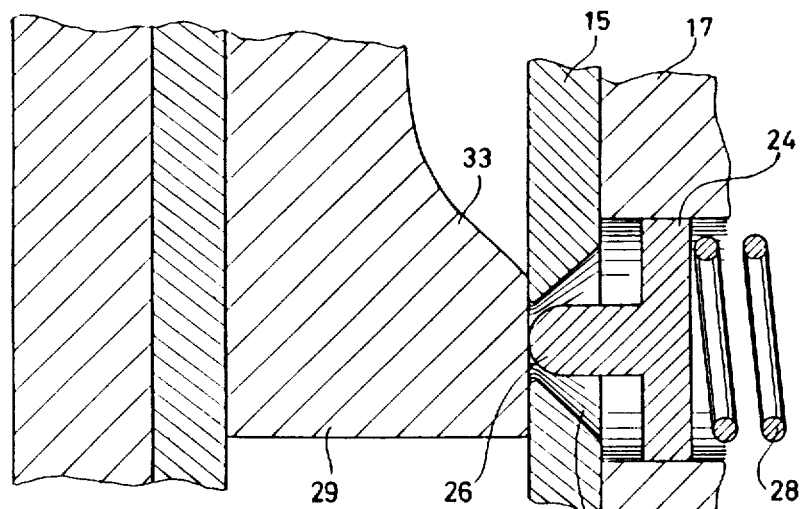
FIG. 5 is an enlarged sectional view of a right locking pin 24, a right slide rod 29 and a locking hole 22 shown in FIG. 2, the state shown in FIG. 5 being where the right slide rod 29 has been upwardly slid.
Figure 6:
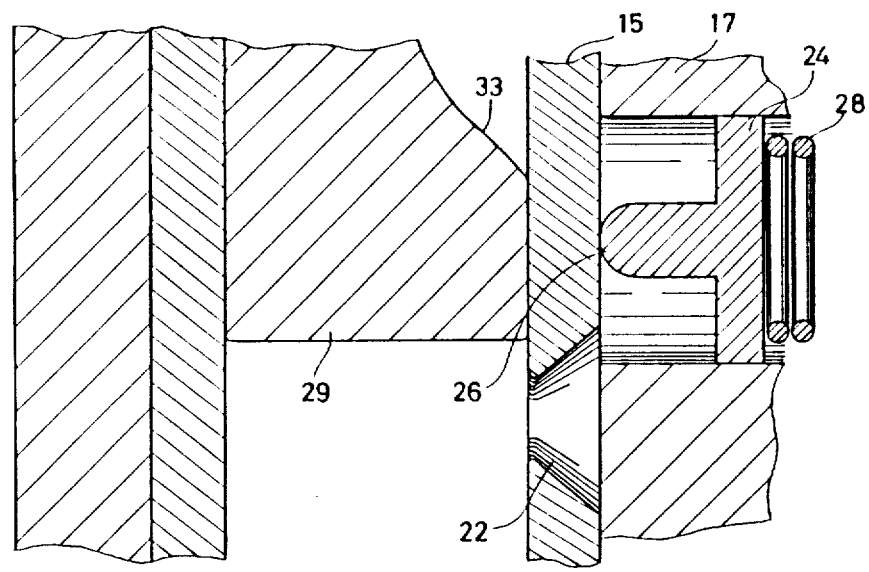
FIG. 6 shows a state where a right upper rod portion 17 has been upwardly slid from the FIG. 5 state.

The inclined surface 33, locking holes 20, 21 and 22, and shaft portion 26 of the right locking pin 24 are so shaped that the states shown in FIGS. 5 and 6 can be attained. That is, when the connecting rod 36 is operated for upward movement, the inclined surface 33 pushes up the shaft portion 26 against the force of the right locking spring 28 to establish the state shown in FIG. 5. Thereafter, the right upper rod portion 17, i.e., the upper rod 13 is operated, whereupon the shaft portion 26 is released from the locking hole 22 to move onto the outer wall surface of the right lower rod 15, thus establishing the state shown in FIG. 6. As an example of the shape with which said operation can be attained, the locking holes 20, 21 and 22 are tapered so that their diameter gradually decreases as it extends from the outer wall surface to the inner wall surface of the right lower rod 15, while the front end of the shaft portion 26 is rounded, the angle of inclination of the inclined surface 33 being suitably selected.

Thus, the connecting rod 36 is operated for movement and then the upper rod 13 is slid to a predetermined position to attain a suitable handle height, when the person lets go his grip on the connecting rod 36, whereupon the right locking pin 24 is moved toward the right lower rod 15 by the action of the right locking spring 28 so as to engage the locking hole 20, 21 or 22. As a result, the slide movement of the upper rod 13 is inhibited. In this manner, the handle height can be easily adjusted.

In the above description, a baby carriage has been shown as an example of a pushcart to which the invention is applied. However, examples of pushcarts are not limited to a baby carriage; for example, the pushcart may be a shopping cart or a load-carrying cart.

Although the present invention has been described and illustrated in detail, it is clearly understood that the same is by way of illustration and example only and is not to be taken by way of limitation, the spirit of the present invention being limited only by the terms of the appended claims.

What is claimed is:

1. A pushcart handle height adjusting mechanism comprising: a horizontally extending handle portion having hollow cylindrical right and left upper rod portions extending downwardly from the right and left ends of said handle portion, right and left lower hollow rods adapted to be respectively received within the inner wall surfaces of said right and left upper rod portions for slidably supporting said upper rod portions, a plurality of locking holes formed in the wall of each of said right and left lower rods, said locking holes being arranged in vertical alignment and at predetermined intervals, right and left locking pins located within the walls of said upper rod portions and adapted to slide in a direction at right angles to said wall surfaces, said locking pins having respective shaft portions capable of extending through said locking holes into the hollow interior portion of said right and left lower rods, one of said locking holes and said locking pins having an inclined surface permitting the entry and exit of said locking pins into said locking holes, right and left locking springs for urging said right and left locking pins to move toward said right and left lower rods, respectively, right and left slide rods slidably installed within the hollow interior portion of said right and left lower rods and said right and left upper rod portions, a connecting rod disposed along said upper rod and connected at its opposite ends to said right and left slide rods, said connecting rod being vertically movable between upper and lower positions with respect to said handle, and spring means for urging said connecting rod and said right and left slide rods to move downwardly, said right and left slide rods being formed with inclined surfaces such that when said right and left slide rods are located at a lower position, the inclined surfaces are positioned below the level of the shaft portions of said right and left locking pins, and when said right and left slide rods are slid upwardly, said inclined surfaces abutt against the shaft portions of said right and left locking pins which project beyond the inner wall surfaces into the hollow interior portion of said right and left lower rods, and when said right and left slide rods are located at an upper position, said inclined surfaces are positioned above the level of the shaft portions of said right and left locking pins, wherein said shaft portions are displaced from the interior of said lower rods when said connecting rod is moved to said upper position thereby permitting said shaft portions to move along the outer wall surfaces of said lower rods for vertical adjustment of said handle.

2. A pushcart handle height adjusting mechanism as set forth in claim 1, wherein said pushcart is a baby carriage.

* * * * *